(12) United States Patent
Nakaya

(10) Patent No.: US 7,031,593 B2
(45) Date of Patent: Apr. 18, 2006

(54) VIDEO TAPE RECORDER

(75) Inventor: Yoshihisa Nakaya, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 1118 days.

(21) Appl. No.: 09/778,800

(22) Filed: Feb. 8, 2001

(65) Prior Publication Data

US 2001/0012436 A1    Aug. 9, 2001

(30) Foreign Application Priority Data

Feb. 8, 2000    (JP) .................... 2000-000551 U

(51) Int. Cl.
*G11B 27/00*    (2006.01)

(52) U.S. Cl. ................. 386/52; 55/64; 386/54; 386/64

(58) Field of Classification Search ............ 386/52–56, 386/75, 95, 96, 99; 360/13
See application file for complete search history.

(56) References Cited

U.S. PATENT DOCUMENTS 5,206,929 A * 4/1993 Langford et al. ............ 715/723
6,201,924 B1 * 3/2001 Crane et al. ................... 386/52
6,314,395 B1 * 11/2001 Chen .......................... 704/233
6,600,874 B1 * 7/2003 Fujita et al. .................. 386/96

FOREIGN PATENT DOCUMENTS

JP    4-257178    9/1992
JP    5-89644    4/1993

* cited by examiner

Primary Examiner—James J. Groody
Assistant Examiner—Jamie J. Vent
(74) Attorney, Agent, or Firm—Crowell & Moring LLP

(57) ABSTRACT

In a video tape recorder, a digital AV signal which is A/D-converted by an A/D converting section 12 is separated into a video signal and an audio signal by an audio-video separating section 131. In response to a selection operation on an operating section 19, the separated digital video and audio signals by an editing section 132 are edited and then recorded on a hard disk 14. The digital video and audio signals which are obtained by performing a reproducing process on the hard disk 14 are supplied by the editing section 132 to an audio-video multiplexing section 134. The digital video and audio signals are multiplexed by the audio-video multiplexing section 134, and then recorded on a D-video tape 15.

6 Claims, 3 Drawing Sheets

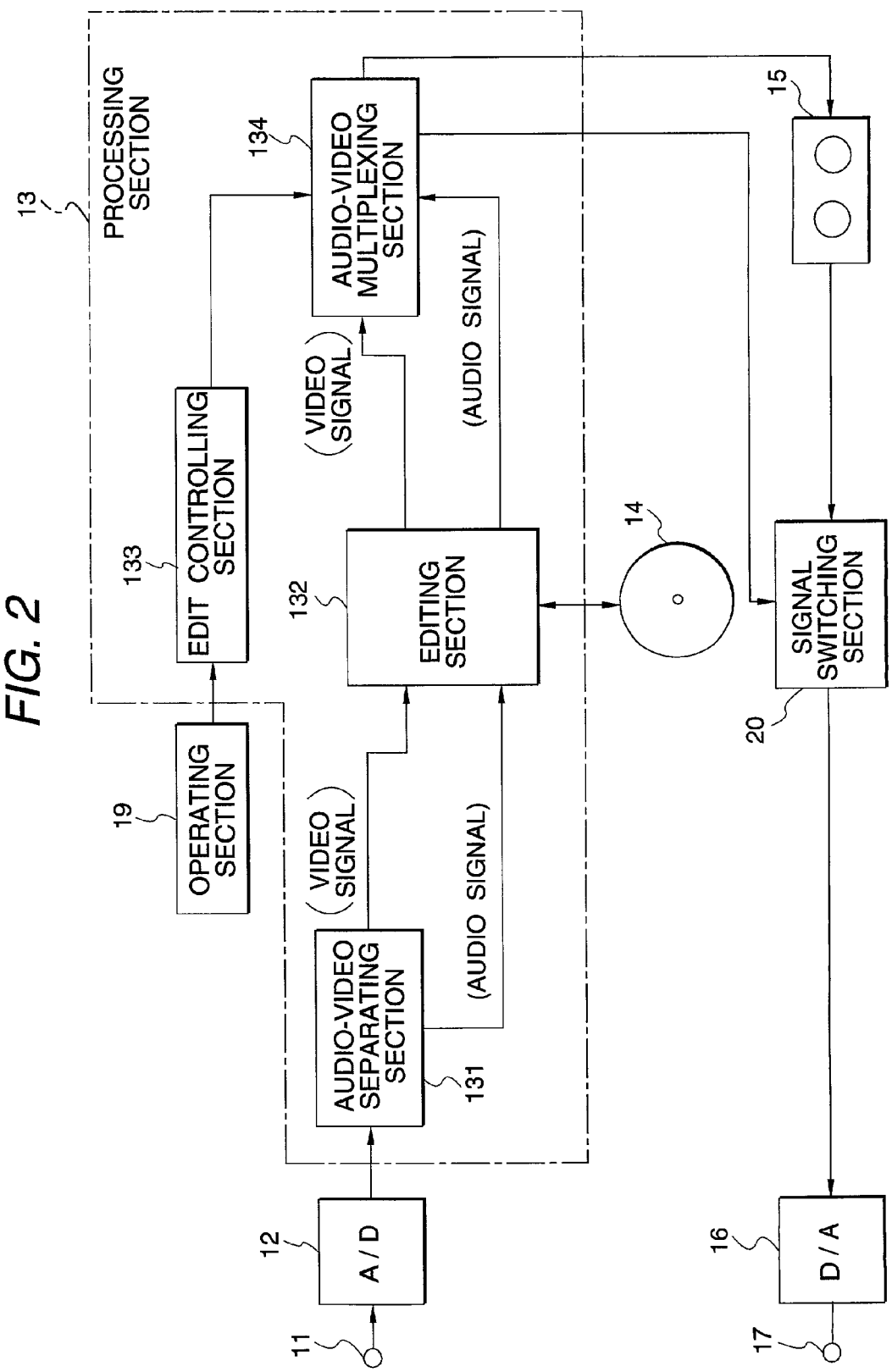

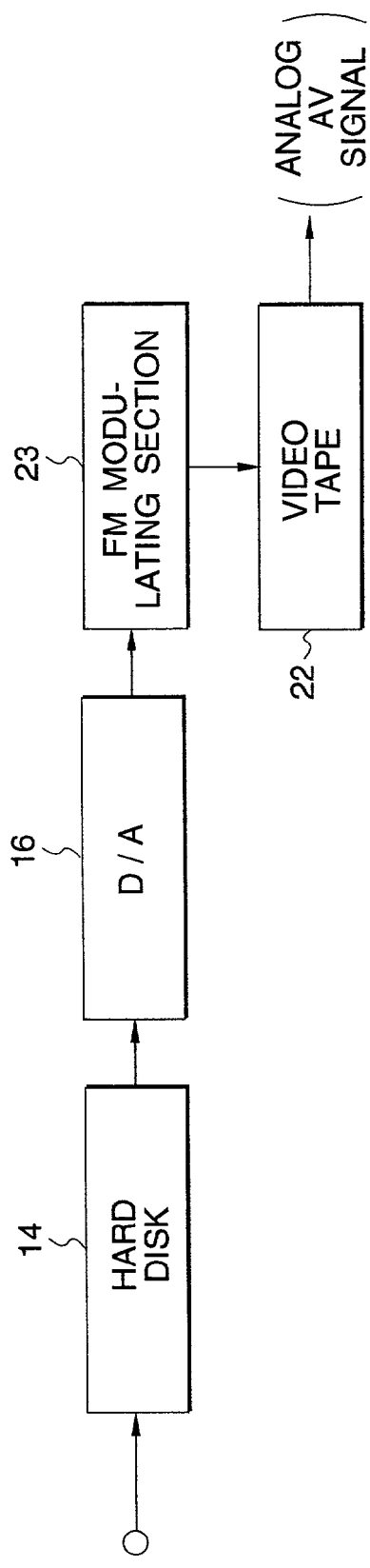
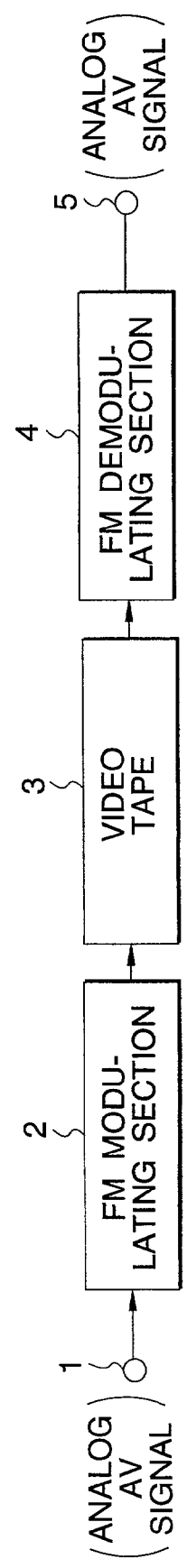

VIDEO TAPE RECORDER

BACKGROUND OF THE INVENTION

1. Field of the Invention

The present invention relates to a video tape recorder in which an analog audio-video signal supplied to an input terminal is separated into a video signal and an audio signal by an audio-video separating section, the video signal and the audio signal are recorded on a video track and an audio track of a video tape, respectively, and the video signal and the audio signal which are recorded on the video tape are reproduced to be output.

2. Description of the Related Art

For example, a conventional video tape recorder is configured as shown in FIG. 4. An analog audio-video (AV) signal supplied to an input terminal 1 is FM-modulated by an FM modulating section 2 to be bandwidth-compressed. The FM-modulated analog AV signal is recorded on an analog record type video tape 3 such as a VHS tape or an S-VHS tape by a recording head which is not shown. The analog AV signal recorded on the video tape 3 is reproduced by a reproducing head which is not shown, the reproduced signal is FM-demodulated by an FM-demodulating section 4, and the demodulated signal is supplied to a television receiver (not shown) through an output terminal 5.

In such a conventional video tape recorder, the video tape 3 serving as a recording medium is a continuous medium on which data are to be continuously recorded. Therefore, such a video tape recorder is used only for simply continuously reproducing an AV signal from the video tape 3.

In order to edit such an AV signal which has been once recorded on the video tape 3, an apparatus having an edit function is necessary in addition to the above-mentioned video tape recorder. Conventionally, an apparatus having an edit function of this kind has been proposed in, for example, JP-A-4-257178 and JP-A-5-89644.

In the apparatus disclosed in the former publication, an image which is identical with that output to a first video signal output terminal is normally output to a second video signal output terminal, and an input video signal is output when recording is performed during a pre-read editing process, thereby enabling recorded materials on a recording medium to be checked by the pre-read editing process while an image output to the second video signal output terminal is monitored on a TV monitor.

By contrast, in the apparatus disclosed in the latter publication, when an editing process of dubbing from a reproducing VTR to a recording VTR is to be performed, a video signal recording and reproducing apparatus which is randomly accessible, such as an optical disk apparatus or a hard disk apparatus is used as an auxiliary reproducing apparatus for the reproducing VTR, and a video output of the reproducing VTR and that of the auxiliary reproducing apparatus are used with being switched over by a switcher.

According to the apparatus disclosed in the former publication, in a so-called pre-read editing process of applying a special effect process such as insertion of a title or a mosaic effect on a material recorded on a recording medium, the material which is to be recorded on the recording medium can be checked by a single VTR, but the material itself which is actually recorded on the recording medium cannot be checked. In the apparatus, furthermore, editing processes other than the pre-read editing process, such as those of changing the sequence of materials to be recorded on the recording medium, and cutting out a portion relating to a commercial cannot be performed.

According to the apparatus disclosed in the latter publication, when a dubbing process is to be performed, a waiting time for locating the beginning of a material in the reproducing VTR can be eliminated and the editing efficiency can be improved. However, the apparatus can perform only a dubbing process, as an edit function, and cannot performs other editing processes such as those of changing the sequence of recorded materials, cutting out a portion relating to a commercial, and simultaneously reproducing an AV signal which is currently recorded. Furthermore, an editing apparatus is required in addition to the reproducing VTR, the recording VTR, and the auxiliary reproducing apparatus, thereby producing a further problem in that the configuration becomes large in scale and complicated.

Another conventional technique relating to an editing process is disclosed in JP-A-8-241172. The technique disclosed in the publication does not relate to a video tape recorder.

SUMMARY OF THE INVENTION

It is an object of the invention to provide a video tape recorder which can perform various editing processes by the recorder alone.

In order to attain the object, the invention provides a video tape recorder in which an analog audio-video signal supplied to an input terminal is separated into a video signal and an audio signal by an audio-video separating section, the video signal and the audio signal are recorded on a video track and an audio track of a video tape, respectively, and the video signal and the audio signal which are recorded on the video tape are reproduced to be output, wherein the video tape recorder comprises: an analog/digital converting section which analog/digital-converts the analog audio-video signal and supplies a resulting signal to the audio-video separating section; an editing section which edits the video signal and the audio signal that are separated from each other by the audio-video separating section; a discontinuous medium on and from which the video signal and the audio signal that are edited by the editing section is to be recorded and reproduced; and a continuous medium on and from which the video signal and the audio signal that are reproduced from the discontinuous medium are continuously recorded and reproduced.

According to this configuration, the analog audio-video signal is once converted into a digital signal by the analog/digital converting section, the digital video and audio signals which are separated from each other by the audio-video separating section are edited by the editing section, the edited video and audio signals are recorded on the discontinuous medium, and the video signal and the audio signal which are reproduced from the discontinuous medium are recorded on the continuous medium.

When the editing section is provided with various edit functions, therefore, video and audio signals which have undergone various editing processes can be recorded on a continuous medium such as a video tape.

Furthermore, the invention is characterized in that, in response to a selection operation on an operating section, the editing section changes a sequence of the video signal and the audio signal which are to be recorded on the discontinuous medium.

According to this configuration, in accordance with a selection operation on the operating section, an editing process of changing the sequence of the video and audio signals which are to be recorded is performed by means of the editing section. When plural programs of satellite broadcasting are to be recorded for a long time period, for example, the sequence of the programs to be recorded may be previously designated. Then, data of the programs are once recorded on the discontinuous medium in the sequence according to preference of the user, and the program data which are recorded on the discontinuous medium are thereafter recorded on the continuous medium such as a video tape. When the continuous medium is subjected to a reproducing process, the user can enjoy reproduced images of the programs which are recorded in the desired sequence.

Furthermore, the invention is characterized in that, in response to a selection operation on an operating section, the editing section cuts out a portion relating to a commercial from the video signal and the audio signal which are to be recorded on the discontinuous medium.

According to this configuration, in accordance with a selection operation on the operating section, an editing process of cutting out a portion relating to a commercial from the video signal and the audio signal which are to be recorded is performed by means of the editing section. When a program of television broadcasting is to be recorded, for example, recording can be performed while cutting out an unnecessary commercial portion.

Furthermore, the invention is characterized in that, in response to a selection operation on an operating section, the editing section reproduces the video signal and the audio signal which have been already recorded on the discontinuous medium, during a recording process performed on the discontinuous medium.

According to this configuration, in accordance with a selection operation on the operating section, an editing process of reproducing the video signal and the audio signal which have been already recorded on the discontinuous medium is performed by means of the editing section during a recording process performed on the discontinuous medium. After the video signal and the audio signal which have been already recorded on the discontinuous medium are checked, therefore, the video and audio signals can be further recorded on the continuous medium such as a video tape.

Furthermore, the invention is characterized in that the continuous medium is configured by a disk-like recording medium such as a hard disk or a magnetooptical recording disk. According to this configuration, a discontinuous medium of a large capacity can be economically obtained because a disk-like recording medium such as a hard disk or a magnetooptical recording disk is relatively economical and has a large storage capacity.

Furthermore, the invention is characterized in that the continuous medium is configured by the continuous medium is configured by a digital record type video tape. According to this configuration, digital video and audio signals which are recorded on the discontinuous medium can be reproduced as they are and then recorded on the continuous medium. Therefore, the user can enjoy a video of a high image quality and a high sound quality.

Furthermore, the invention is characterized in that the video tape recorder further comprises a digital/analog converting section which digital/analog-converts a reproduced signal of the video signal and the audio signal that are recorded on the discontinuous medium, and the continuous medium is configured by an analog record type video tape on which the video signal and the audio signal that are digital/analog-converted by the digital/analog converting section are to be recorded.

According to this configuration, digital video and audio signals which are recorded on the discontinuous medium are converted into analog signals by the digital/analog converting section, and then recorded on the continuous medium. Therefore, a general-purpose analog record type video tape can be used as the continuous medium.

BRIEF DESCRIPTION OF THE DRAWINGS

FIG. 2 is a block diagram showing the embodiment of the invention in detail;

FIG. 3 is a block diagram of a part of another embodiment of the invention; and

FIG. 4 is a block diagram of a conventional art example.

DETAILED DESCRIPTION OF THE PREFERRED EMBODIMENTS

Figure 1:
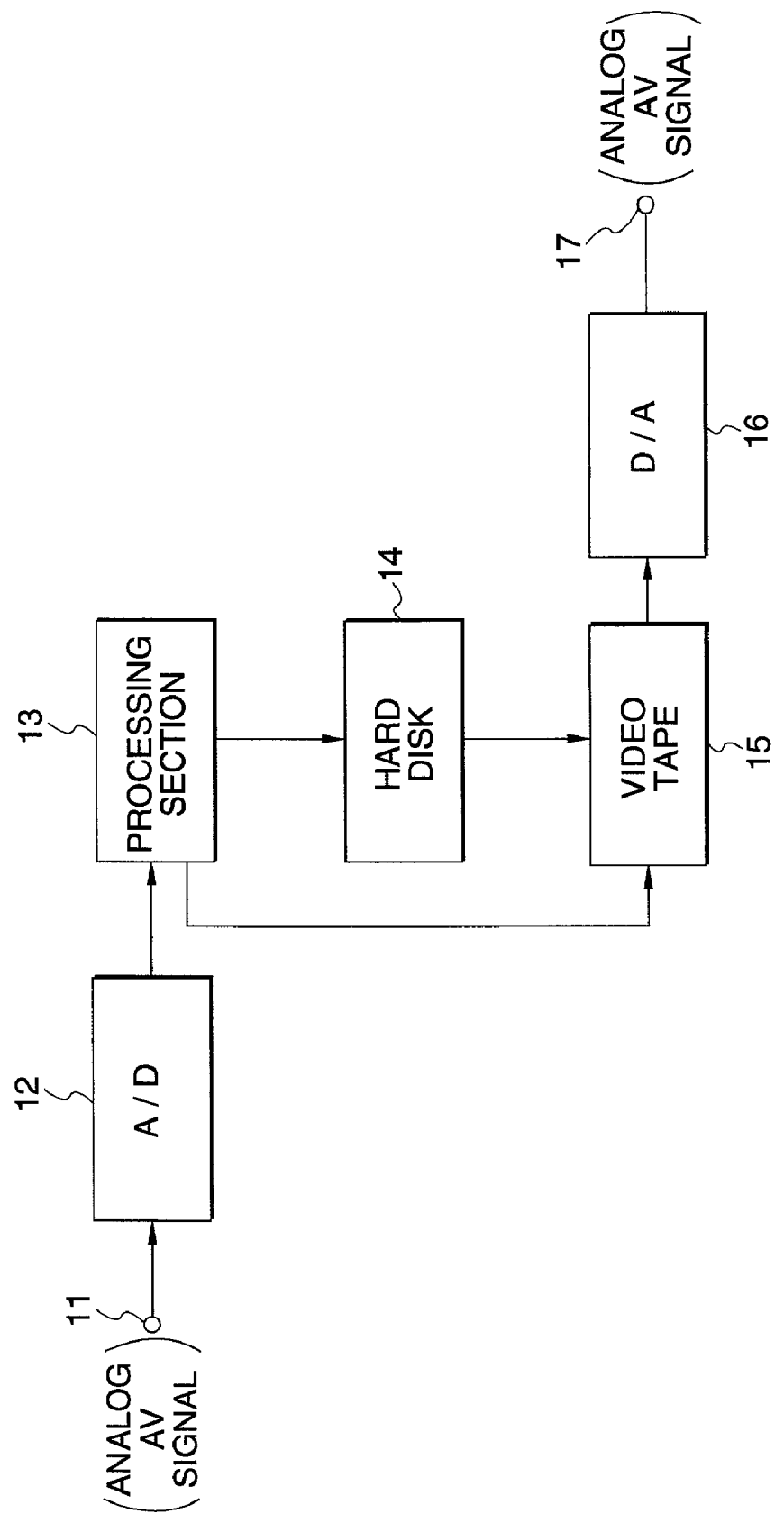
FIG. 1 is a block diagram schematically showing an embodiment of the invention.

An embodiment of the invention will be described with reference to FIGS. 1 and 2. FIG. 1 is a block diagram schematically showing the embodiment, and FIG. 2 is a block diagram showing the embodiment in detail.

First, a schematic of the configuration of the embodiment will be described. As shown in FIG. 1, an analog audio-video (AV) signal supplied to an input terminal 11 is converted into a digital signal by an analog/digital converting section 12 (hereinafter, analog/digital is abbreviated to A/D). The A/D-converted digital AV signal is separated into a video signal and an audio signal by an audio-video separating section constituting a processing section 13. The separated digital video and audio signals are subjected to an editing process according to a selection operation on an operating section, by an editing section constituting the processing section 13. The edited digital video and audio signals are recorded on a hard disk 14 which is a discontinuous medium. In order to perform a recording for one hour, for example, a capacity of about 1 Gbytes is required. In accordance with a recordable time period, therefore, the hard disk 14 is preferably selected to have a capacity of 10 Gbytes, 20 Gbytes, or the like.

The editing section, and an edit controlling section which controls the editing section are configured by, for example, a chip which performs processes according to MPEG2 (Moving Picture Experts Group Phase 2) standard which is an international standard for compression and expansion of a color moving picture. The sections compress separated digital video and audio signals, perform a predetermined editing process on the signals, and then record the signals on the hard disk 14. In a reproducing process, the sections perform operations such as those of decoding compressed video and audio signals which are obtained by performing a reproducing process on the hard disk 14, and expanding the signals to the original ones.

The video and audio signals which are obtained by performing a reproducing process on the hard disk 14 are recorded on, for example, a digital record type video tape (hereinafter, such a tape is referred to as D-video tape) 15 which is a continuous medium, by the processing section 13. Video and audio signals which are obtained by performing a reproducing process on the D-video tape 15 are converted into analog signals by a digital/analog converting section 16 (hereinafter, digital/analog is abbreviated to D/A). The D/A-converted AV (audio-video) signal is output to the outside through an output terminal 17.

Next, the configuration of the processing section 13 will be described in more detail with reference to FIG. 2. As shown in FIG. 2, the processing section 13 is configured by:

the audio-video separating section 131 which separates the digital AV signal that is A/D-converted by the A/D converting section 12, into a video signal and an audio signal; the editing section 132 which edits the separated digital video and audio signals, and records and reproduces the signals on and from the hard disk 14; the edit controlling section 133 which controls the editing section 132 in accordance with a key operation on the operating section 19 having, for example, operation keys (not shown) for selecting plural editing processes; and an audio-video multiplexing section 134 which, under the control of the edit controlling section 133, multiplexes the digital video and audio signals that are obtained by performing a reproducing process on the hard disk 14 by the editing section 132, and then records the multiplexed signal on the D-video tape 15.

Although not shown in FIG. 2, a controlling section which controls recording and reproduction of the hard disk 14, and those of the D-video tape 15 is disposed.

Referring to FIG. 2, 20 denotes a signal switching section which, in response to a switching operation, can switchingly supply either of the reproduced signal from the multiplexing section 134 and that from the D-video tape 15, to the D/A converting section 16.

The editing section 132 performs editing processes such as: (1) a process of arranging the video and audio signals which are to be recorded on the hard disk 14, in the sequence according to a key operation on the operating section 19; (2) that of cutting out a portion relating to a commercial from the video and audio signals which are to be recorded on the hard disk 14; and (3) that of reproducing the video and audio signals which have been already recorded on the hard disk 14, during a recording process performed on the hard disk 14. These processes can be selected by a key operation on the operating section 19.

The editing process of changing the sequence in (1) above is effective in the case where, for example, plural programs of satellite broadcasting are to be recorded for a long time period and reproduced images of the recorded programs are to be enjoyed in a desired sequence when the D-video tape 15 is subjected to a reproducing process. When the user operates the operating section 19 to previously designate the sequence of the programs to be recorded, data of the programs are once recorded on the hard disk 14 in the sequence according to preference of the user, and the program data which are recorded on the hard disk 14 are thereafter recorded on the D-video tape 15.

The editing process of cutting a commercial in (2) above is a well-known process which has been already employed in a VTR. When a movie program of television broadcasting is to be recorded, for example, the editing process is used for detecting a portion relating to a commercial and cutting out the portion so as not to record it. When the D-video tape 15 is subjected to a reproducing process, the user can continuously enjoy only a reproduced image of the movie without seeing the unnecessary commercial.

The editing process (3) above, or the editing process of reproducing the video and audio signals which have been already recorded on the hard disk 14, during a recording process performed on the hard disk 14 enables the video and audio signals which have been already recorded on the hard disk 14 to be checked and then further recorded on the D-video tape 15. Therefore, it is possible to check a result of the editing process on the spot.

One of the editing processes (1) to (3) may be selectively implemented in accordance with a selection operation on the operating section 19. Alternatively, an adequate combination of the editing processes may be preferably implemented.

As described above, when an analog AV signal supplied to the input terminal 11 is to be recorded on the D-video tape 15, the analog AV signal is once converted into a digital signal by the A/D converting section 12, digital video and audio signals which are separated from each other by the audio-video separating section 131 are edited by the editing section 132, the edited video and audio signals are recorded on the hard disk 14, and video and audio signals which are obtained by performing a reproducing process on the hard disk 14 are recorded on the D-video tape 15.

By contrast, when a signal which is recorded on the D-video tape 15 is to be reproduced, in the same manner as a usual VTR, the D-video tape 15 is subjected to a reproducing process by a reproducing head under the control of the controlling section, the obtained reproduced signal is converted into an analog signal by the D/A converting section 16, and the analog signal is supplied to an external television receiver or the like through the output terminal 17.

In the embodiment, therefore, an editing process according to preference of the user can be applied on the input analog AV signal by the editing section 132, and the signal can be then recorded on the video tape 15. Namely, video and audio signals which have undergone various editing processes can be easily recorded on the D-video tape 15 by the single apparatus.

Furthermore, various editing processes of the editing section 132 can be selected in accordance with a selection operation on the operating section 19. Therefore, an AV signal supplied to the input terminal can be finally recorded on the D-video tape 15 after the signal undergoes an editing process according to preference of the user.

When the editing process of changing the recording sequence is selected, for example, the editing process of changing the sequence is once performed to attain the sequence to be recorded on the hard disk 14, and recording from the hard disk 14 to the D-video tape 15 is then performed, whereby the user can enjoy reproduced images in a desired sequence.

When the editing process of cutting out a commercial is selected, a commercial which is not necessary in recording of a program of television broadcasting is not recorded. Therefore, the user can enjoy reproducing only desired images.

When the editing process of reproducing video and audio signals which have been already recorded on the hard disk 14 is selected, recording can be performed while the video and audio signals which have been actually recorded on the hard disk 14 are checked. Namely, recording can be performed while only desired video and audio signals are reproduced and the user checks the signals.

In the embodiment, the case where the discontinuous medium is configured by the hard disk 14 has been described. The discontinuous medium is not restricted to this, and may be configured by a magnetooptical recording disk or another disk-like recording medium.

In the embodiment, the case where the continuous medium is configured by the D-video tape 15 has been described. In other embodiments of the invention, it is a matter of course that the continuous medium may be configured by an analog record type video tape such as an S-VHS tape or a VHS tape. In this case, as shown in FIG. 3, the D/A converting section 16 shown in FIG. 2 and an FM modulating section 23 are disposed between the hard disk 14 and an analog record type video tape 22, a signal reproduced from the hard disk 14 is D/A-converted by the D/A converting section 16, the signal is then FM-modulated by the FM modulating section 23, and the FM-modulated signal is recorded on the video tape 22.

In the embodiment, the editing process is not restricted to the above-described processes. An editing process of another kind may be performed.

The invention is not restricted to the embodiment, and may be variously modified without departing from the spirit of the invention.

As described above, according to the first aspect of the invention, the analog audio-video signal is once converted into a digital signal by the analog/digital converting section, the digital video and audio signals which are separated from each other by the audio-video separating section are edited by the editing section, the edited video and audio signals are recorded on the discontinuous medium, and the video signal and the audio signal which are reproduced from the discontinuous medium are recorded on the continuous medium.

When the editing section is provided with various edit functions, therefore, it is possible to provide a video tape recorder which has excellent functions, and in which video and audio signals that have undergone various editing processes can be recorded on a continuous medium such as a video tape by the recorder alone.

According to the second aspect of the invention, when the operating section is selectively operated and an editing process of changing the sequence of the video and audio signals which are to be recorded is performed by means of the editing section, the video and audio signals can be once recorded on the discontinuous medium in the sequence according to preference of the user, and the video and audio signals which are recorded on the discontinuous medium can be thereafter recorded on the continuous medium such as a video tape. When the continuous medium is subjected to a reproducing process, the user can enjoy reproduced images of the programs which are recorded in the desired sequence.

According to the third aspect of the invention, the operating section is selectively operated, and an editing process of cutting out a portion relating to a commercial from the video signal and the audio signal which are to be recorded is performed by means of the editing section. When a program of television broadcasting is to be recorded, for example, recording can be therefore performed while cutting out an unnecessary commercial portion.

According to the fourth aspect of the invention, the operating section is selectively operated, and an editing process of reproducing the video signal and the audio signal which have been already recorded on the discontinuous medium is performed by means of the editing section during a recording process performed on the discontinuous medium. After the video signal and the audio signal which have been already recorded on the discontinuous medium are checked, therefore, the video and audio signals can be further recorded on the continuous medium such as a video tape.

According to the fifth aspect of the invention, a discontinuous medium of a large capacity can be economically obtained because a disk-like recording medium such as a hard disk or a magnetooptical recording disk is relatively economical and has a large storage capacity.

According to the sixth aspect of the invention, digital video and audio signals which are recorded on the discontinuous medium can be reproduced as they are and then recorded on the continuous medium. Therefore, the user can enjoy a video of a high image quality and a high sound quality.

According to the seventh aspect of the invention, digital video and audio signals which are recorded on the discontinuous medium are converted into analog signals by the digital/analog converting section, and then recorded on the continuous medium. Therefore, a general-purpose analog record type video tape can be used as the continuous medium.

What is claimed is:

1. A video tape recorder in which an analog audio-video signal supplied to an input terminal is separated into a video signal and an audio signal by an audio-video separating section, the video signal and the audio signal are recorded on a video track and an audio track of a video tape, respectively, and the video signal and the audio signal which are recorded on the video tape are reproduced to be output, said video tape recorder comprising:
    an analog/digital converting section which analog/digital-converts the analog audio-video signal and supplies a resulting signal to said audio-video separating section;
    an editing section which edits the video signal and the audio signal that are separated from each other by said audio-video separating section;
    a discontinuous medium on and from which the video signal and the audio signal that are edited by said editing section is to be recorded and reproduced; and
    a continuous medium on and from which the video signal and the audio signal that are reproduced from said discontinuous medium are continuously recorded and reproduced, wherein, in response to a selection operation on an operating section, said editing section changes a sequence of the video signal and the audio signal which are to be recorded on said discontinuous medium.

2. A video tape recorder according to claim 1, wherein, in response to another selection operation on an operating section, said editing section cuts out a portion relating to a commercial from the video signal and the audio signal which are to be recorded on said discontinuous medium.

3. A video tape recorder according to claim 1, wherein, in response to another selection operation on an operating section, said editing section reproduces the video signal and the audio signal which have been already recorded on said discontinuous medium, during a recording process performed on said discontinuous medium.

4. A video tape recorder according to claim 1, wherein said discontinuous medium is configured by a disk-like recording medium such as a hard disk or a magnetooptical recording disk.

5. A video tape recorder according to claim 1, wherein said continuous medium is configured by a digital record type video tape.

6. A video tape recorder according to claim 1, wherein said video tape recorder further comprises a digital/analog converting section which digital/analog-converts a reproduced signal of the video signal and the audio signal that are recorded on said discontinuous medium, and said continuous medium is configured by an analog record type video tape on which the video signal and the audio signal that are digital/analog-converted by said digital/analog converting section are to be recorded.

* * * * *